United States Patent
Pinto et al.

(10) Patent No.: US 12,026,562 B2
(45) Date of Patent: Jul. 2, 2024

(54) INDUSTRY OPINIONATED API MANAGED SERVICE

(71) Applicant: Red Hat, Inc., Raleigh, NC (US)

(72) Inventors: Ilan Pinto, Efraim (IL); Tudor Mihalache, Tel Aviv (IL); Ilona Shishov, Netanya (IL); Ruben Romero Montes, Granada (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/890,640

(22) Filed: Aug. 18, 2022

(65) Prior Publication Data

US 2024/0061732 A1    Feb. 22, 2024

(51) Int. Cl.
| | |
|---|---|
| *G06F 9/54* | (2006.01) |
| *G06F 8/36* | (2018.01) |
| *G06F 9/50* | (2006.01) |
| *H04L 47/78* | (2022.01) |

(52) U.S. Cl.
CPC ............. *G06F 9/547* (2013.01); *G06F 8/36* (2013.01); *G06F 9/5005* (2013.01); *G06F 9/54* (2013.01); *H04L 47/78* (2013.01)

(58) Field of Classification Search
CPC .......... G06F 9/547; G06F 9/5005; G06F 8/36; G06F 9/54; H04L 47/78
See application file for complete search history.

(56) References Cited

U.S. PATENT DOCUMENTS

| | | | | |
|---|---|---|---|---|
| 8,352,608 B1 * | 1/2013 | Keagy | .................. | G06F 9/45558 709/225 |
| 9,513,941 B2 * | 12/2016 | Feng | .................. | H04L 67/1097 |
| 9,900,264 B1 * | 2/2018 | Chen | .................. | G06F 9/54 |
| 10,055,797 B2 | 8/2018 | Kunapuli et al. | | |
| 10,089,130 B2 * | 10/2018 | Kim | .................. | G06F 9/45558 |
| 10,153,897 B1 * | 12/2018 | Jezewski | ............. | H04L 63/0428 |
| 10,983,759 B1 * | 4/2021 | Kumar | ................. | H04L 63/083 |
| 11,032,160 B1 * | 6/2021 | Raheja | ............... | H04L 41/0843 |
| 11,099,818 B2 * | 8/2021 | Bojara | ................. | H04L 63/20 |
| 11,467,887 B1 * | 10/2022 | Caudill | .................. | G06F 9/54 |
| 2006/0026586 A1 * | 2/2006 | Remmel | .................. | G06F 8/71 717/121 |
| 2013/0282748 A1 * | 10/2013 | Liensberger | ........ | G06F 9/44526 707/766 |

(Continued)

OTHER PUBLICATIONS

Thani, "What does "Opinionated API" mean?", Feb. 16, 2015, https://stackoverflow.com/a/28535731 (Year: 2015).*

(Continued)

*Primary Examiner* — Ramy M Osman
(74) *Attorney, Agent, or Firm* — Womble Bond Dickinson (US) LLP

(57) ABSTRACT

Systems and methods for implementing an industry opinionated managed service are disclosed. A request from a client is received that includes a set of application programming interface (API) parameters comprising an industry type selection. An API managed service is implemented based on the set of API parameters, which includes creating a client-specific API and provisioning a set of backend resources based on the set of API parameters. The API managed service is deployed to an operational cloud, and one or more commands are processed at the operational cloud through the client-specific API utilizing the provisioned set of backend resources.

17 Claims, 6 Drawing Sheets

(56) References Cited

U.S. PATENT DOCUMENTS

| | | | | |
|---|---|---|---|---|
| 2014/0026113 | A1* | 1/2014 | Farooqi | G06F 8/36 |
| | | | | 717/107 |
| 2014/0163410 | A1* | 6/2014 | Sela | A61B 5/375 |
| | | | | 600/545 |
| 2014/0366000 | A1* | 12/2014 | Batabyal | G06F 8/61 |
| | | | | 717/120 |
| 2016/0092173 | A1* | 3/2016 | Rodrigues | H04L 67/00 |
| | | | | 717/106 |
| 2016/0292018 | A1* | 10/2016 | Laredo | H04L 67/10 |
| 2017/0257276 | A1* | 9/2017 | Chou | G06F 9/45558 |
| 2018/0004553 | A1* | 1/2018 | Wagner | G06F 9/5077 |
| 2018/0026858 | A1* | 1/2018 | Zhang | H04L 41/5054 |
| | | | | 709/226 |
| 2018/0089005 | A1* | 3/2018 | Green | G06F 9/547 |
| 2018/0115551 | A1* | 4/2018 | Cole | H04L 47/783 |
| 2018/0307464 | A1* | 10/2018 | Bijani | G06F 8/36 |
| 2019/0028350 | A1* | 1/2019 | Yeung | H04L 41/0813 |
| 2019/0034244 | A1* | 1/2019 | Yang | G06F 9/5077 |
| 2020/0348986 | A1* | 11/2020 | Venkatesh | G06F 8/36 |
| 2020/0358714 | A1* | 11/2020 | Singleton, IV | H04L 67/141 |
| 2021/0089368 | A1* | 3/2021 | Goosen | H04L 41/046 |
| 2021/0216288 | A1* | 7/2021 | Bahrami | G06F 11/3688 |
| 2021/0279115 | A1* | 9/2021 | Aspro | G06F 9/541 |
| 2021/0406088 | A1* | 12/2021 | Chen | H04L 67/568 |
| 2022/0057999 | A1* | 2/2022 | Pitchai Muthu | G06F 8/30 |
| 2022/0058064 | A1* | 2/2022 | Ueno | G06F 9/547 |
| 2022/0269801 | A1* | 8/2022 | Hua | H04L 67/34 |
| 2022/0284421 | A1* | 9/2022 | Upadhye | G06Q 20/352 |
| 2023/0046582 | A1* | 2/2023 | Hong | H04L 67/10 |
| 2023/0267018 | A1* | 8/2023 | Bakshi | G06F 9/541 |
| | | | | 719/328 |
| 2024/0061732 | A1* | 2/2024 | Pinto | G06F 9/547 |

OTHER PUBLICATIONS

IBM, "What is API management?", Mar. 15, 2022, https://www.ibm.com/resources/automate/apimanagement-whatis (Year: 2022).*

Deloitte Touche Tohmatsu India LLP, "API-enabled digital ecosystems", Apr. 2021, 26 pp. total.

Tiffany Xingyu Wang et al., "APIs Aren't Just for Tech Companies", Harvard Business Review, Apr. 13, 2021, 7 pp. total.

Salesforce, Inc., "Financial service firms find value in APIs", 2022, 4 pp. total.

IBM, "Identifying API use cases: Retain industry", Sep. 2016, 12 pp. total.

Srinivas Guruaja Rau, "Integrating API ecosystems to fuel innovation", Voices, Economy, India, TOI, Apr. 5, 2022, 11 pp. total.

* cited by examiner

500

```
┌─────────────────────────────────────────────────────────────┐
│ Receiving a request from a client that includes a set of    │
│ application programming interface (API) parameters          │
│ comprising an industry type selection                       │
│                          510                                │
└─────────────────────────────────────────────────────────────┘
                              │
                              ▼
┌─────────────────────────────────────────────────────────────┐
│ Implementing an API managed service based on the set of API │
│ parameters, wherein the implementing comprises creating a   │
│ client-specific API and provisioning a set of backend       │
│ resources based on the set of API parameters                │
│                          520                                │
└─────────────────────────────────────────────────────────────┘
                              │
                              ▼
┌─────────────────────────────────────────────────────────────┐
│ Deploying the API managed service to an operational cloud   │
│                          530                                │
└─────────────────────────────────────────────────────────────┘
                              │
                              ▼
┌─────────────────────────────────────────────────────────────┐
│ Processing one or more commands through the client-specific │
│ API utilizing the provisioned set of backend resources      │
│                          540                                │
└─────────────────────────────────────────────────────────────┘
```

FIG. 5

INDUSTRY OPINIONATED API MANAGED SERVICE

TECHNICAL FIELD

Aspects of the present disclosure relate to function-as-a-service (FaaS) systems, and more particularly, to provide an industry opinionated API managed service to a client.

BACKGROUND

Cloud computing services offer various levels that dictate what a customer manages and what a vendor manages, such as hardware, virtualization, operating system, middleware, runtime environment, data, and applications. Function-as-a-Service (FaaS) is a cloud computing service that provides a platform allowing customers to develop, run, and manage application functionalities without the complexity of building and maintaining the infrastructure. Functions are pieces of software executing logic, and applications may be composed of many functions.

FaaS provides an event-driven computing execution model that runs in stateless containers and allows developers to build, run, and manage application packages as functions without having to maintain their own infrastructure. FaaS provides a way to implement serverless computing that abstracts infrastructure concerns, such as provisioning and managing servers as well as resource allocation, from developers and shifts it to a platform (e.g., the Red Hat™ OpenShift™ platform).

FaaS may be utilized in e-commerce services, such as in B2B (business-to-business) electronic commerce (e-commerce). Using FaaS for B2B commerce allows a business to pay for function execution time without incurring high infrastructure costs.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a flow diagram of a method 500 for establishing a client-specific industry opinionated API managed service, in accordance with some embodiments.

DETAILED DESCRIPTION

Figure 1:
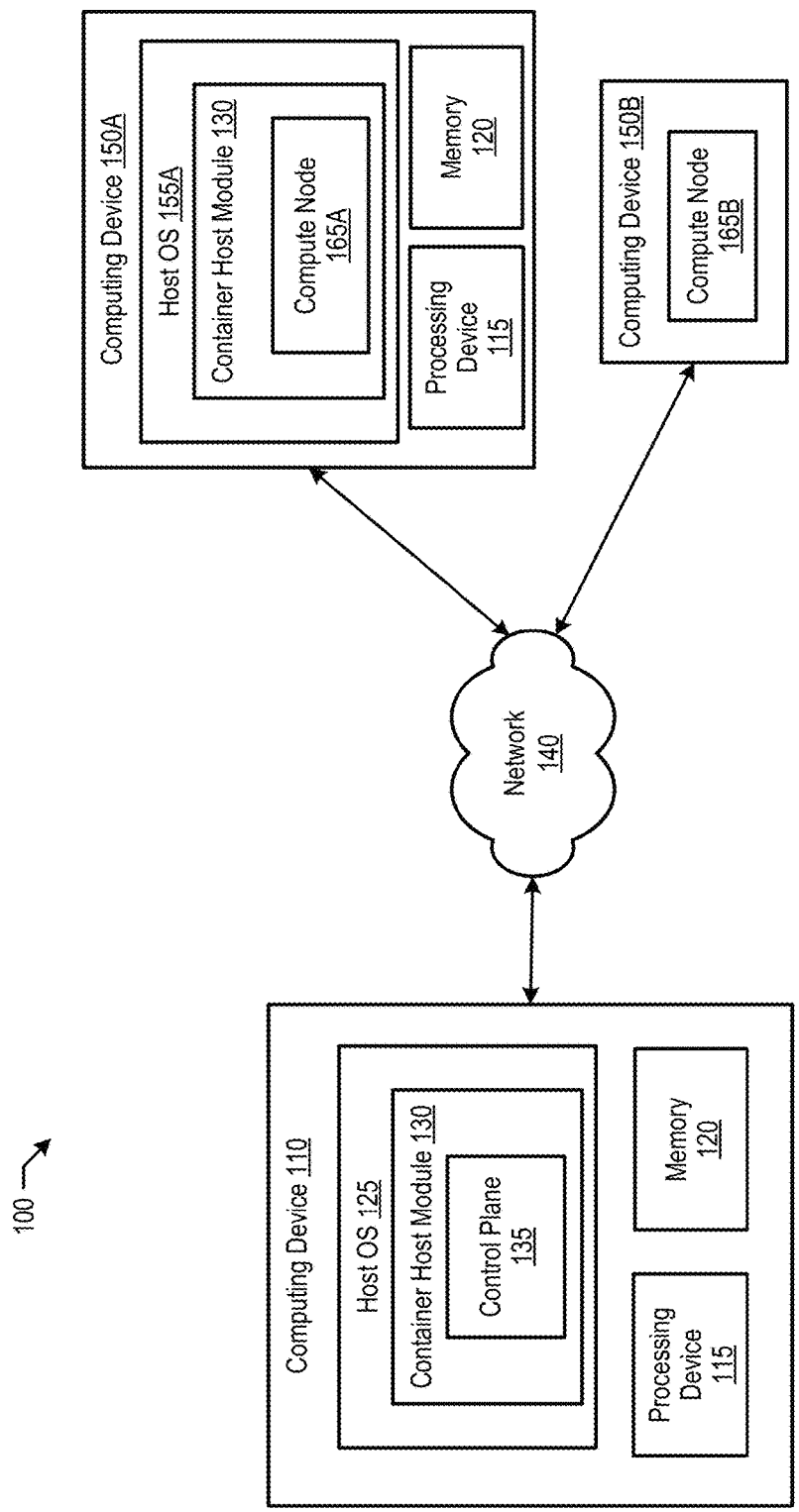
FIG. 1 is a block diagram that illustrates an example system, in accordance with some embodiments of the present disclosure.

Business-to-business (B2B) transactions are transactions between businesses, such as transactions between a bank and a business, a manufacturer and wholesaler, and etcetera. Today, many businesses have difficulty conducting B2B transactions due to application programming interface (API) inflexibilities, which define and establish a set of functions, procedures, methods or classes used by computer programs to request services from the operating system, software libraries or any other service providers running on the computer.

Each industry has challenges in B2B transactions. In the banking industry, the larger banks have their specific APIs and a business is required to conform to the bank's API. For example, if a small business wishes to integrate with three different banks that have three different APIs, the small business is required to conform to the three different APIs. This creates challenges with the small business as well as the banks because the small business does not have the resources to create and manage multiple APIs and the banks lose new business because of the difficulty in conforming to their particular API. Similar challenges can be found in industries other than the banking industry, such as the gas and oil industry, automotive industry, or any other industry that has larger corporations in control of an API for B2B transactions.

Some organizations exist that provide a standardized API approach, such as the Banking Industry Architecture Network (BIAN). A challenge with these approaches is that they do not provide backend support or implementation support. As such, a business is still required to purchase backend resources and implementation support to conform to the standardized API approach.

The present disclosure addresses the above-noted and other deficiencies by using a processing device to receive a request from a client that includes a set of application programming interface (API) parameters comprising an industry type selection. The processing device may implement an API managed service based on the set of API parameters, which includes creating a client-specific API and provisioning a set of backend resources based on the set of API parameters. The processing device may deploy the API managed service to an operational cloud, and process one or commands through the client-specific API utilizing the provisioned set of backend resources. In some embodiments, the client-specific API managed service may be an opinionated API managed service based on an industry standard API corresponding to the client's industry type selection.

In some embodiments, while implementing the API managed service, the processing device may access a set of business process configuration parameters based on the industry type selection. The processing device may access a set of opinionated API libraries based on the industry type selection and provide a user interface to the client that includes one or more client selection options based on the set of business process configuration parameters and the set of opinionated API libraries. The processing device may receive a set of client selections responsive to providing the user interface to the client, and then customize the API managed service based on the set of client selections.

In some embodiments, the processing device may provide, responsive to customizing the API managed service, an opinionated API to the client. The processing device may receive a set of logic changes from the client in response to providing the opinionated API and modify the opinionated API into the client-specific API based on the set of logic changes.

In some embodiments, at least one API parameter from the set of API parameters is an availability zone, a scale, a security level, or an endpoint name. In this embodiment, the processing device may create the client-specific API based on the at least one API configuration parameter.

In some embodiments, the request is a first request and the client is a first client. In this embodiment, the processing device may receive a second request from the first client to interface with a second client through the API managed service. The second request includes a token that identifies both the first client and the second client. The processing device may then establish a connection between the first client and the second client in response to determining that the second client is authorized to interface with the first client. In this embodiment, the second client may connect with the first client through an industry standard API that is based on a banking industry type.

FIG. 1 is a block diagram that illustrates an example system 100. As illustrated in FIG. 1, system 100 includes a computing device 110, and a plurality of computing devices 150. The computing devices 110 and 150 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In some embodiments, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 150. Each computing device 110 and 150 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 150 may comprise a single machine or may include multiple interconnected machines (e.g., multiple servers configured in a cluster). The computing devices 110 and 150 may be implemented by a common entity/organization or may be implemented by different entities/organizations. For example, computing device 110 may be operated by a first company/corporation and one or more computing devices 150 may be operated by a second company/corporation. Each of computing device 110 and computing devices 150 may execute or include an operating system (OS) such as host OS 125 and host OS 155 respectively, as discussed in more detail below. The host OS of a computing device 110 and 150 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 150 may each implement a compute node (e.g., as part of the container orchestration engine).

In some embodiments, a container orchestration engine 130 (referred to herein as container host 130), such as the Redhat™ OpenShift™ module, may execute on the host OS 125 of computing device 110 and the host OS 155 of computing device 150, as discussed in further detail herein. The container host module 130 may be a platform for developing and running containerized applications and may allow applications and the data centers that support them to expand from just a few machines and applications to thousands of machines that serve millions of clients. Container host 130 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 130 provides a function-based architecture of smaller, decoupled units that work together. In some embodiments, computing device 150 may execute on an operational cloud, such as operational cloud 280 shown in FIGS. 2-4.

Container host 130 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 130 or a registry server. In some embodiments, the image file may include one or more base layers. An image file may be shared by multiple containers. When the container host 130 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 130 may work with are called pods. A pod may refer to one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, they are assigned to run on a node, and they run until their container(s) exit or they are removed based on their policy and exit code. Although a pod may contain more than one container, the pod is the single unit that a user may deploy, scale, and manage. The control plane 135 of the container host 130 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 135 may expose applications to internal and external networks by defining network policies that control communication with containerized applications (e.g., incoming HTTP or HTTPS requests for services inside the cluster 165).

A typical deployment of the container host 130 may include a control plane 135 and a cluster of compute nodes 165, including compute nodes 165A and 165B (also referred to as compute machines). The control plane 135 may include REST APIs which expose objects as well as controllers which read those APIs, apply changes to objects, and report status or write back to objects. The control plane 135 manages workloads on the compute nodes 165 and also executes services that are required to control the compute nodes 165. For example, the control plane 135 may run an API server that validates and configures the data for pods, services, and replication controllers as well as provides a focal point for the cluster 165's shared state. The control plane 135 may also manage the logical aspects of networking and virtual networks. The control plane 135 may further provide a clustered key-value store (not shown) that stores the cluster 165's shared state. The control plane 135 may also monitor the clustered key-value store for changes to objects such as replication, namespace, and service account controller objects, and then enforce the specified state.

The cluster of compute nodes 165 are where the actual workloads requested by users run and are managed. The compute nodes 165 advertise their capacity and a scheduler (not shown), which is part of the control plane 135, determines which compute nodes 165 containers and pods will be started on. Each compute node 165 includes functionality to accept and fulfill requests for running and stopping container workloads, and a service proxy, which manages communication for pods across compute nodes 165. A compute node 165 may be implemented as a virtual server, logical container, or GPU, for example.

Figure 2:
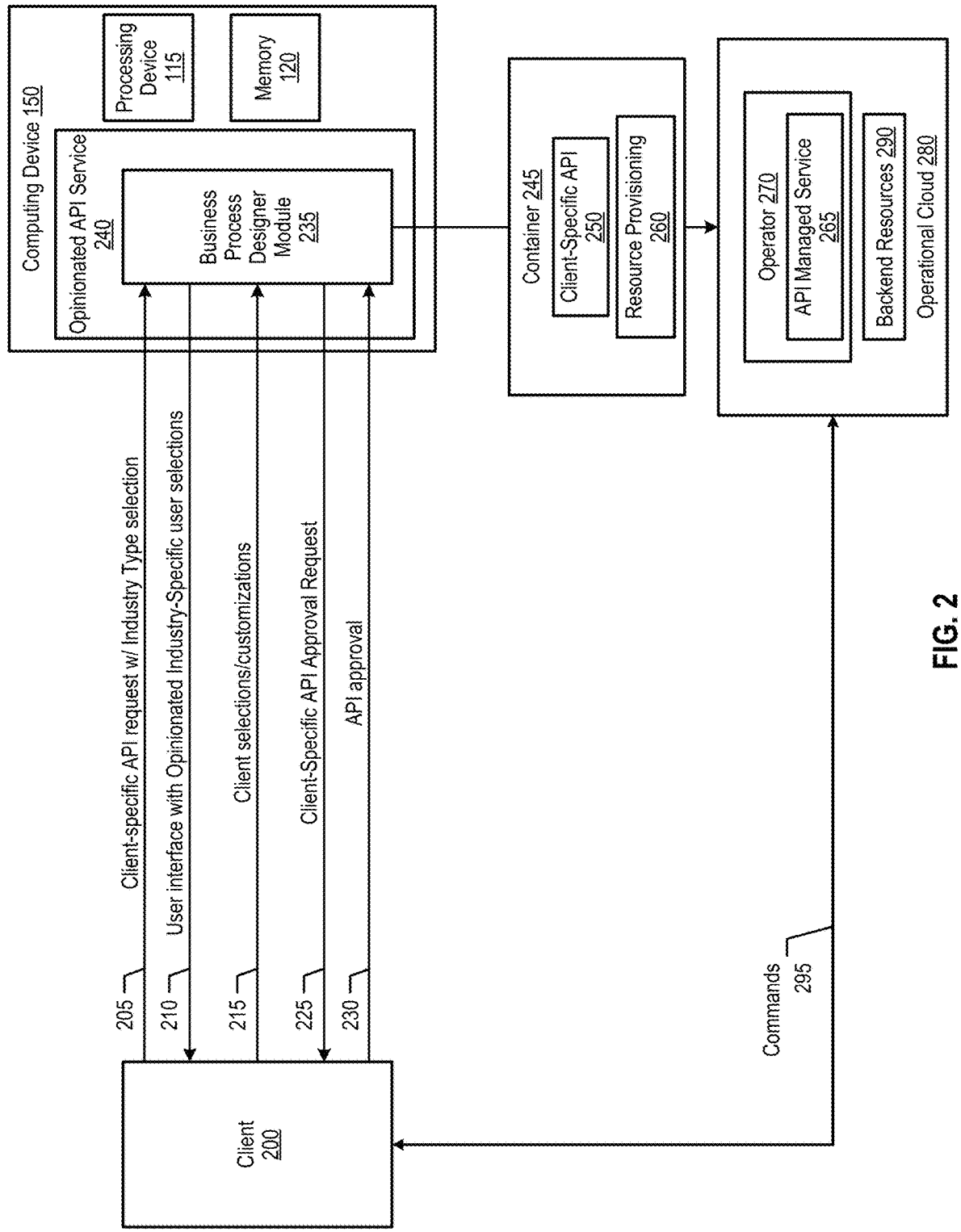
FIG. 2 is a block diagram that illustrates an example system for creating and deploying a client-specific API.

FIG. 2 is a block diagram that illustrates an example system for creating and deploying a client-specific API. A business uses client 200 to connect over network 140 to opinionated API service 240 executing on computing device 150. Opinionated API service 240 includes business process designer module 235. Business process designer module 235, in some embodiments, is a web application for designing the business flow, inputs and outputs to create client-specific API 250. In some embodiments, as discussed herein, business process designer module 235 provides user interface windows and industry opinionated selection options to client 200 during the process of creating client-specific API 250.

Figure 4:
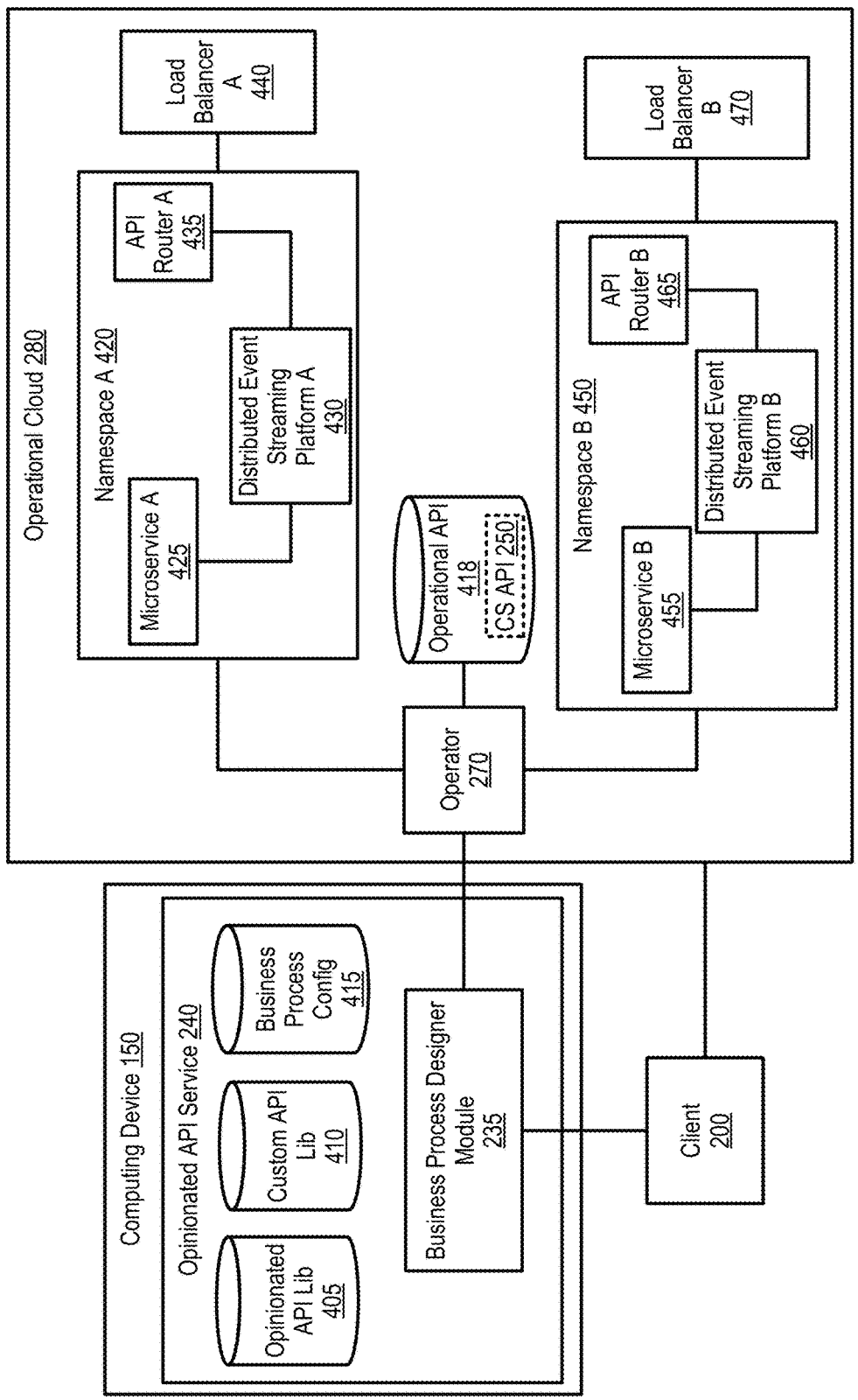
FIG. 4 is a block diagram that illustrates an example system for creating, deploying, and utilizing a client-specific API.

Client 200 sends request 205 to computing device 235, which includes a client-specific API request and, in some embodiments, includes an industry type selection. Business process designer module 235 analyzes request 205 and identifies predefined APIs associated with client 200's industry type selection. Referring to FIG. 4, Business process designer module 230 searches opinionated API library database 405 for banking-based predefined APIs such as a BIAN API or Open Banking API.

Client 200 provides client selections/customizations 215 to business process designer module 235, which may include a selection of one of the predefined API services. In some embodiments, client selections/customizations 215 may include a predefined process upload; code insertions to append to the predefined API service; business process modifications using a detected UI; and/or a YAML to define the process flow. YAML (yet another markup language) is a data serialization language that may be used for writing configuration files. YAML is human-readable, easily understandable, and can be used in conjunction with other programming languages.

In some embodiments, client selections/customizations 215 includes a scalability selection of services, such as a selection of an expected number of hourly, daily, and/or monthly requests. In some embodiments, client selections/customizations 215 includes availability zone selections that select, for example, zones/countries in which the API will be exposed and available. In some embodiments, client selections/customizations 215 includes a monitoring level selection such as high/medium/low, which indicates [QUESTION: please provide description of what the monitoring level indicates].

Business process designer module 235 creates client-specific API 250 based on client 200's selections, customizations, and/or selected predefined industry API, and sends client-specific API approval request 225 to client 200. Upon receiving API approval 230, business process designer module 235 sends client-specific API 250 and resource provisioning 260 to operator 270 in operational cloud 280 via container 245 for deployment. Resource provisioning 260 informs operator 270 of the amount and type of backend resources 290 to provision to client 200 based on client selections/customizations 215 (e.g., scalability selection, availability selections, etc.). Operator 270 implements API managed service 265 based on client-specific API and is responsible for deploying, provisioning backend resources 290, and ensuring the health of the business process Kubernetes components and services that support client-specific API 250 (see FIG. 4 and corresponding text for further details). Once deployed, client 200 sends/receives commands 295 to/from operational cloud 280 through API managed service 265 (e.g., through client-specific API 250) (see FIGS. 3, 4, and corresponding text for further details).

In some embodiments, business process designer module 235 provides a dedicated user interface or wizard that allows client 200 to step through and select business logic for the creation of client-specific API 250. In some embodiments, client 200 may begin with a standard business process and modify the business process. For example, client 200 may start with a process of approving a new credit for an applicant. In this example, the business process requests basic applicant information and during the process there is a point where applicant details are sent to a third party to validate the applicant (may be a different partner). At this point, client 200 may wish to modify the business process based on the applicant's debt and/or income levels.

Figure 3:
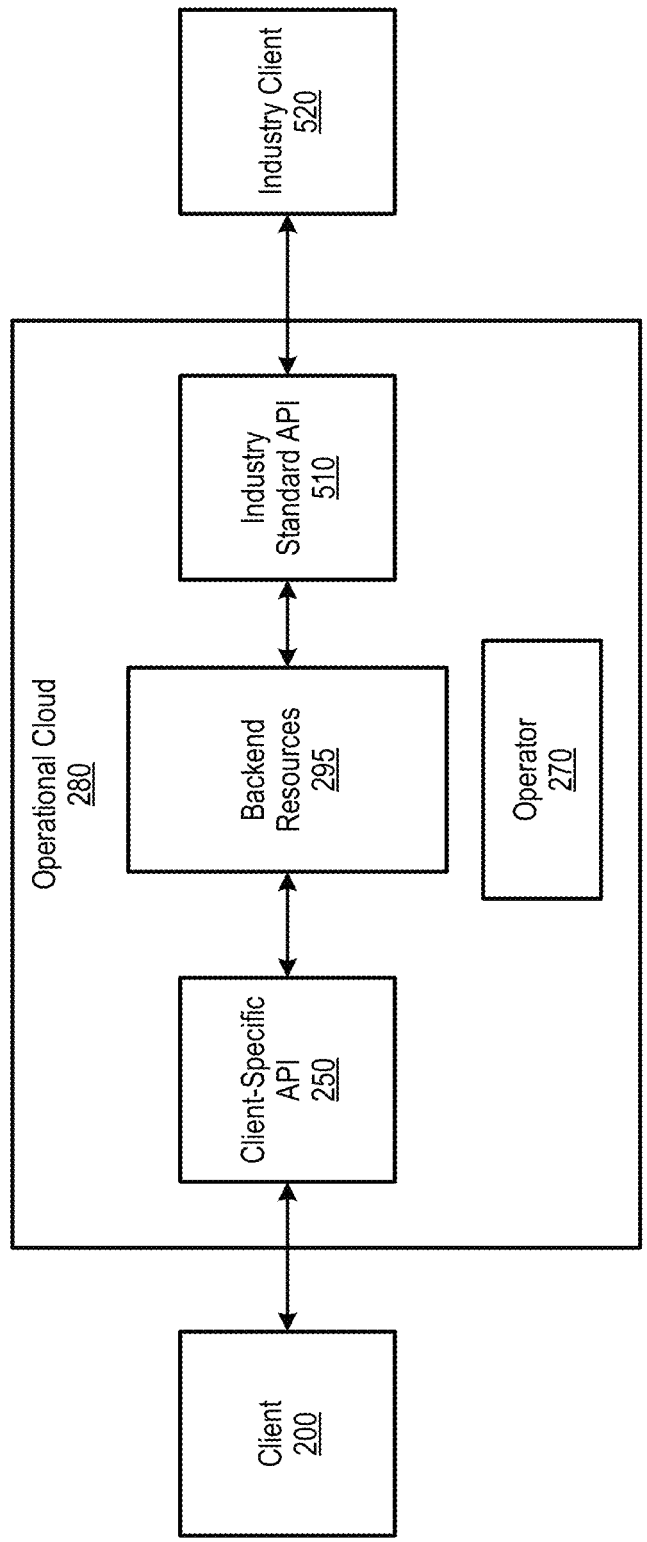
FIG. 3 is a block diagram that illustrates an example system that enables a client to conduct B2B transactions with an industry standard API through a client-specific API.

FIG. 3 is a block diagram that illustrates an example system that enables a client to conduct B2B transactions with an industry standard API through an API managed service that includes a client-specific API. Once deployed and implemented, client 200 uses client-specific API 250 to conduct B2B transactions with industry client 520 (e.g. a bank) through the industry client's API (industry standard API 510). Operator 270 provisions backend resources 290 that support client-specific API 250's transactions between industry standard API 510. As such, neither client 200 nor industry client 520 are required to provide resources (e.g., hardware, software, personnel, etc.) and deployment in order to conduct B2B transactions with each other.

In some embodiments, B2B participants are preregistered and are identified by a unique identifier. In these embodiments, tokens are utilized to connect various B2B partners. For example, industry client 520 may be a bank, and the bank creates a token that includes the bank's unique identifier and client 200's unique identifier. Based on the token, operator 270 connects client-specific API 250 to industry standard API 510.

FIG. 4 is a block diagram that illustrates an example system for creating, deploying, and utilizing a client-specific API as discussed herein. Referring to FIG. 2, business process designer module 235 interfaces with client 200 to create API managed service 265 that includes client-specific API 250.

During the creation process, business process designer module 235 may access opinionated API library 405, custom API library 410, and/or business process configuration storage 415. Opinionated API library 405 includes a database that stores all predefined APIs. Business process designer 235 pulls particular predefined processes from opinionated API library 405 based on client 200's industry type selection. Custom API library 410 includes a database where business process designer module 235 stores a user's modified business processes. And, business process configuration 415 stores parameters in use by business process designer module 235, such as [QUESTION: Please provide examples of the parameters].

Operator 270 receives client-specific AP 250 from business process designer module 235 via container 245 and stores it in operational API storage 418. In some embodiments, operator 270 stores client-specific API 250 as a YAML in a storage block. Operator 270 deploys client-specific API 250 and provisions resources on operational cloud 280 for client 200 accordingly. In turn, client 200 interacts with operational cloud 280 through client specific API 250 as discussed herein.

In some embodiments, operational cloud 280 supports a Kubernetes platform, components, and services. Kubernetes is a portable, extensible, open source platform for managing containerized workloads and services, that facilitates both declarative configuration and automation. In some embodiments, operational cloud 280 supports an event-driven architecture (EDA) on the Kubernetes platform. EDA is an approach of designing applications and services to respond to real-time information based on the sending and receiving of information about individual events. EDA is based on asynchronous non-blocking communication between event producers and event consumers that are able to release the resource consumption while waiting for the response to return.

In some embodiments, operational cloud 280 provisions various Kubernetes components for each client. Namespaces A 420 and B 450 organize clusters into virtual sub-clusters (e.g., for client 200 and industry client 520). Each of the namespaces include a microservice, a distributed event streaming platform, and an API router. Microservice A 425 and B 455 are independent components that run as a service within their respective namespace. Distributed event streaming platforms A 430 and B 460 are, in some embodiments, open-source platforms used for high-performance data pipelines, streaming analytics, data integration, and mission-critical applications. API routers A 435 and B 465, in some embodiments, are REST APIs that provide a mechanism for routing API requests intended for API Servers. Load balancers A 440 A and B 470 acts as reverse proxies and distribute network or application traffic across a number of servers. In some embodiments, load balancers A 440 A and B 470 send connections to a first server in a pool until it is at capacity, and then sends new connections to a next available server.

In some embodiments, client-specific API 250 may be provided to client 200 as a Software-as-a-Service (SaaS), which is a type of cloud computing service where a service provider provides additional support layers above FaaS. SaaS is a software licensing and delivery model in which the service provider licenses software on a subscription basis and is centrally hosted. The service provider may host the application and related data using its own servers, databases, networking and computing FIG. 5 is a flow diagram of a method 500 for establishing a client-specific industry opinionated API managed service, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 150 illustrated in FIGS. 1 and 2).

At block 510, computing device 150 may receive a request from a client that includes a set of application programming interface (API) parameters comprising an industry type selection. Referring to FIG. 2, business process designer module 235 receives a client-specific API request that includes API parameters with an industry type selection, such as a banking industry type selection. In some embodiments, business process designer module 235 may not receive the industry type selection in the initial client request 205. In this embodiment, business process designer module 235 may receive request 205 and then provide an industry selection list to client 200 from which to choose.

At block 520, computing device 150 may implement an API managed service based on the set of API parameters. The API managed service may include a client-specific API and a set of backend resource provisions based on the set of API parameters. Referring to FIG. 2, business process designer module 235 creates client-specific API 250 and resource provisioning 260. In some embodiments, client 200 and business process designer module 235 exchange information before creating the client-specific API. Referring to FIG. 2, Business process designer module 235 sends a user interface with opinionated industry-specific user selections (210). Client 200 then provides client selections/customizations 215 to business process designer module 235.

At block 530, computing device 150 may deploy the API managed service to an operational cloud. Referring to FIG. 2, in some embodiments prior to deploying the API managed service, Business process designer module 235 first sends an approval request 225 to client 200 to approve of the client-specific API. Once Business process designer module 235 receives API approval f230 from client 200, Business process designer module 235 sends container 245, which includes client-specific API 250 and resource provisioning 260, to operational cloud 280 for deployment.

At block 540, computing device 150 may process one or more commands from client through the client-specific API 250 utilizing the provisioned set of backend resources 290.

Referring to FIGS. 3 and 4, client 200 interfaces with operational cloud 280 to send/receive transactions to/from industry client 520.

Figure 6:
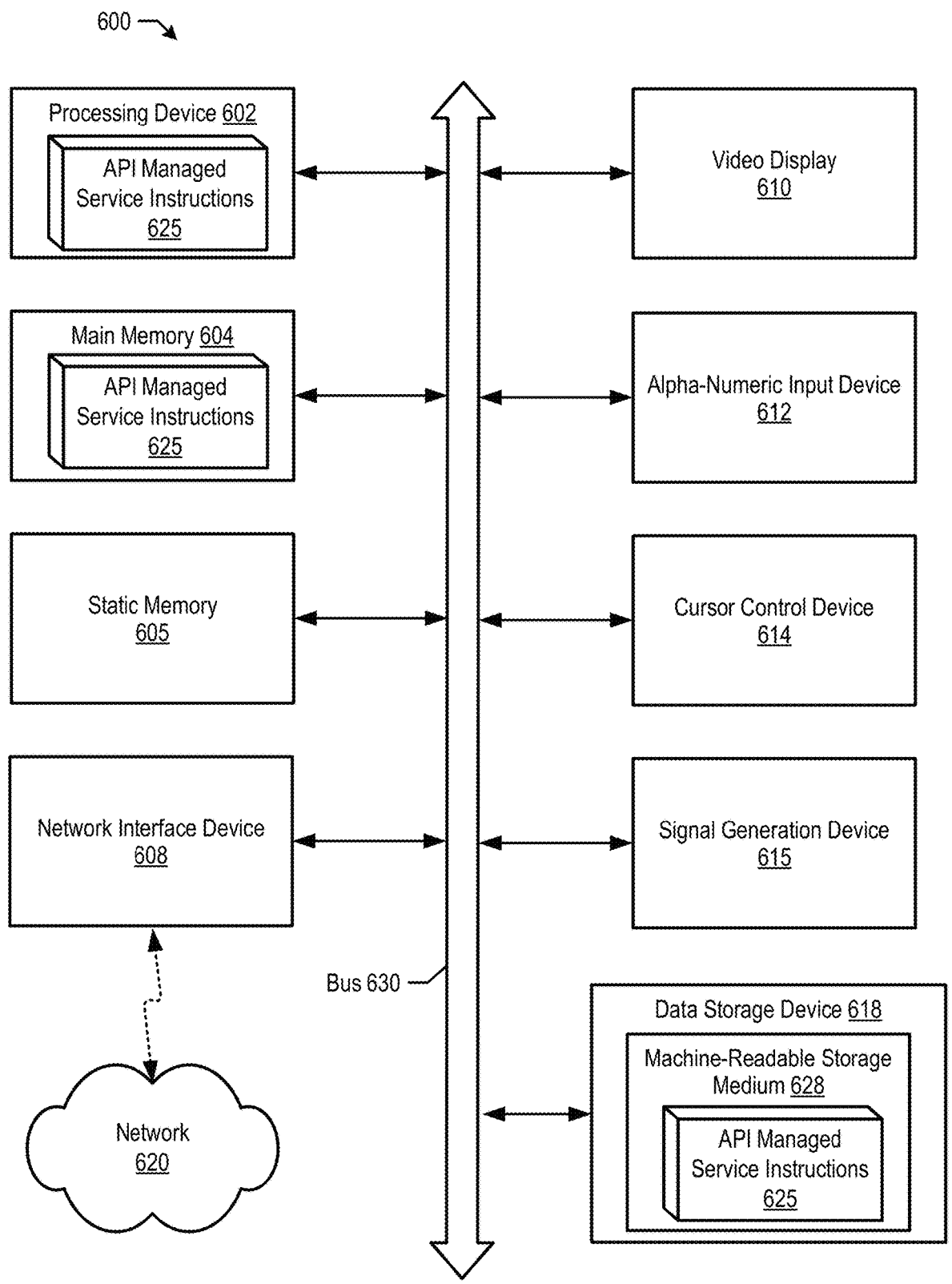
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute API managed service instructions 625, for performing the operations and steps discussed herein.

The data storage device 618 may include a machine-readable storage medium 628, on which is stored one or more sets of API managed service instructions 625 (e.g., software) embodying any one or more of the methodologies of functions described herein. The API managed service instructions 625 may also reside, completely or at least partially, within the main memory 604 or within the processing device 602 during execution thereof by the computer system 600; the main memory 604 and the processing device 602 also constituting machine-readable storage media. The API managed service instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving a request from a client that includes a set of application programming interface (API) parameters comprising an industry type selection;
    creating a client-specific API based on an industry standard API corresponding to the industry type selection;
    deploying, by a processing device, an API managed service on an operational cloud based on the set of API parameters, wherein the API managed service comprises the client-specific API and the deploying comprises provisioning a set of backend resources to the operational cloud to support the client-specific API; and
    processing, by the API managed service, one or more commands using the client-specific API, wherein the client-specific API utilizes the provisioned set of backend resources to communicate with the industry standard API.

2. The method of claim 1, wherein the method further comprises:
    accessing a set of business process configuration parameters based on the industry type selection;
    accessing a set of opinionated API libraries based on the industry type selection;
    providing a user interface to the client that includes one or more client selection options based on the set of business process configuration parameters and the set of opinionated API libraries;
    receiving a set of client selections responsive to providing the user interface to the client; and
    customizing the API managed service based on the set of client selections.

3. The method of claim 2, further comprising:
    providing, responsive to customizing the API managed service, an opinionated API to the client;
    receiving a set of logic changes from the client in response to providing the opinionated API; and
    modifying the opinionated API based on the set of logic changes, wherein the modified opinionated API is the client-specific API.

4. The method of claim 1, further comprising:
    wherein at least one API parameter from the set of API parameters is selected from the group consisting of an availability zone, a scale, a security level, and an endpoint name; and
    creating the client-specific API based on the at least one API parameter.

5. The method of claim 1, wherein the request is a first request and the client is a first client, the method further comprising:
    receiving a second request from the first client to interface with a second client through the API managed service, wherein the second request includes a token that identifies both the first client and the second client; and establishing a connection between the first client and the second client in response to determining that the second client is authorized to interface with the first client.

6. The method of claim 5 wherein the second client connects with the first client through the industry standard API.

7. The method of claim 6 wherein the industry standard API is based on a banking industry type.

8. A system comprising:
a processing device; and
a memory to store instructions that, when executed by the processing device cause the processing device to:
  receive a request from a client that includes a set of application programming interface (API) parameters comprising an industry type selection;
  create a client-specific API based on an industry standard API corresponding to the industry type selection;
  deploy an API managed service on an operational cloud based on the set of API parameters, wherein the API managed service comprises the client-specific API and the deployment comprises provisioning a set of backend resources on the operational cloud to support the client-specific API; and
  process, by the API managed service, one or more commands using the client-specific API, wherein the client-specific API utilizes the provisioned set of backend resources to communicate with the industry standard API.

9. The system of claim 8, wherein the processing device, responsive to executing the instructions, further causes the system to:
  access a set of business process configuration parameters based on the industry type selection;
  access a set of opinionated API libraries based on the industry type selection;
  provide a user interface to the client that includes one or more client selection options based on the set of business process configuration parameters and the set of opinionated API libraries;
  receive a set of client selections responsive to providing the user interface to the client; and
  customize the API managed service based on the set of client selections.

10. The system of claim 9, wherein the processing device, responsive to executing the instructions, further causes the system to:
  provide, responsive to customizing the API managed service, an opinionated API to the client;
  receive a set of logic changes from the client in response to providing the opinionated API; and
  modify the opinionated API based on the set of logic changes, wherein the modified opinionated API is the client-specific API.

11. The system of claim 8, wherein the processing device, responsive to executing the instructions, further causes the system to:
  wherein at least one API parameter from the set of API parameters is selected from the group consisting of an availability zone, a scale, a security level, and an endpoint name; and
  create the client-specific API based on the at least one API parameter.

12. The system of claim 8, wherein the request is a first request and the client is a first client, and wherein the processing device, responsive to executing the instructions, further causes the system to:
  receive a second request from the first client to interface with a second client through the API managed service, wherein the second request includes a token that identifies both the first client and the second client; and
  establish a connection between the first client and the second client in response to determining that the second client is authorized to interface with the first client.

13. The system of claim 12 wherein the second client connects with the first client through the industry standard API that is based on a banking industry type.

14. A non-transitory computer readable medium, having instructions stored thereon which, when executed by a processing device, cause the processing device to:
  receive a request from a client that includes a set of application programming interface (API) parameters comprising an industry type selection;
  create a client-specific API based on an industry standard API corresponding to the industry type selection;
  deploy, by the processing device, an API managed service on an operational cloud based on the set of API parameters, wherein the API managed service comprises the client-specific API and the deployment comprises provisioning a set of backend resources on the operational cloud to support the client-specific API; and
  process, by the API managed service, one or more commands using the client-specific API, wherein the client-specific API utilizes the provisioned set of backend resources to communicate with the industry standard API.

15. The non-transitory computer readable medium of claim 14, wherein to implement the API managed service, the processing device is to:
  access a set of business process configuration parameters based on the industry type selection;
  access a set of opinionated API libraries based on the industry type selection;
  provide a user interface to the client that includes one or more client selection options based on the set of business process configuration parameters and the set of opinionated API libraries;
  receive a set of client selections responsive to providing the user interface to the client; and
  customize the API managed service based on the set of client selections.

16. The non-transitory computer readable medium of claim 15, wherein the processing device is to:
  provide, responsive to customizing the API managed service, an opinionated API to the client;
  receive a set of logic changes from the client in response to providing the opinionated API; and
  modify the opinionated API based on the set of logic changes, wherein the modified opinionated API is the client-specific API.

17. The non-transitory computer readable medium of claim 14, wherein at least one API parameter from the set of API parameters is selected from the group consisting of an availability zone, a scale, a security level, and an endpoint name, and wherein the processing device is to:
  create the client-specific API based on the at least one API parameter.

* * * * *